United States Patent
Sukawa et al.

(10) Patent No.: US 9,647,287 B2
(45) Date of Patent: May 9, 2017

(54) FUEL CELL SYSTEM

(71) Applicant: Panasonic Corporation, Osaka (JP)

(72) Inventors: Toru Sukawa, Osaka (JP); Kunihiro Ukai, Nara (JP)

(73) Assignee: PANASONIC CORPORATION, Osaka (JP)

( * ) Notice: Subject to any disclaimer, the term of this patent is extended or adjusted under 35 U.S.C. 154(b) by 179 days.

(21) Appl. No.: 14/639,154

(22) Filed: Mar. 5, 2015

(65) Prior Publication Data

US 2015/0263369 A1    Sep. 17, 2015

(30) Foreign Application Priority Data

Mar. 14, 2014   (JP) .................................. 2014-051942

(51) Int. Cl.
| | | |
|---|---|---|
| *H01M 8/04* | (2016.01) | |
| *H01M 8/04007* | (2016.01) | |
| *H01M 8/04014* | (2016.01) | |
| *H01M 8/0662* | (2016.01) | |
| *H01M 8/04089* | (2016.01) | |
| *H01M 8/0612* | (2016.01) | |
| *H01M 8/124* | (2016.01) | |

(52) U.S. Cl.
CPC ..... *H01M 8/0675* (2013.01); *H01M 8/04014* (2013.01); *H01M 8/04067* (2013.01); *H01M 8/04097* (2013.01); *H01M 8/0618* (2013.01); *H01M 8/0612* (2013.01); *H01M 2008/1293* (2013.01)

(58) Field of Classification Search
None
See application file for complete search history.

(56) References Cited

U.S. PATENT DOCUMENTS

2014/0072892 A1    3/2014 Maenishi et al.

FOREIGN PATENT DOCUMENTS

| EP | 1437785 | 7/2004 |
|---|---|---|
| EP | 2887437 | 6/2015 |
| JP | 2010-272333 | 12/2010 |
| JP | 2011-216308 | 10/2011 |
| JP | 2013-229120 | 11/2013 |
| WO | 2010/081936 | 7/2010 |

OTHER PUBLICATIONS

The Extended European Search Report dated Aug. 10, 2015 for the related European Patent Application No. 15157183.3.

*Primary Examiner* — Yoshitoshi Takeuchi
(74) *Attorney, Agent, or Firm* — McDermott Will & Emery LLP

(57) ABSTRACT

The fuel cell system includes a hydro-desulfurizer that removes a sulfur compound in raw material gas; a raw material gas heating unit that heats raw material gas before the raw material gas enters the hydro-desulfurizer; a reformer that generates reformed gas using the raw material gas that has passed through the hydro-desulfurizer; a fuel cell that generates electric power using the reformed gas from the reformer as fuel; a combustor that combusts fuel unused in the fuel cell; an exhaust gas channel through which exhaust gas generated in the combustor flows; and a housing that is provided in a part of the exhaust gas channel and houses the raw material gas heating unit and the hydro-desulfurizer, in which exhaust gas flowing through the housing undergoes heat exchange with the raw material gas heating unit and the hydro-desulfurizer.

14 Claims, 12 Drawing Sheets

FUEL CELL SYSTEM

BACKGROUND

1. Technical Field

The present disclosure relates to a fuel cell system.

2. Description of the Related Art

In a fuel cell system using hydrocarbon as raw material gas, the raw material gas is reformed through reforming reaction. The raw material gas contains, for example, a sulfur compound as odorant and the sulfur compound can cause degradation of a reforming catalyst used for promoting the reforming reaction. For preventing the degradation of the reforming catalyst, a desulfurization device for removing the sulfur compound contained in the raw material gas is utilized.

For the desulfurization device, an absorbent desulfurizer and a hydro-desulfurizer are typically used. A hydro-desulfurizer converts a sulfur compound into a hydrogen sulfide, which is easier to be absorbed, and removes the hydrogen sulfide by causing it be absorbed to absorbent, and has the advantage of higher absorption capacity than the absorbent desulfurizer.

For example, Japanese Unexamined Patent Application Publication No. 2011-216308 describes a technique for removing sulfur compounds in raw material gas through hydrogenation reaction by passing hydrogenated raw material gas through a hydro-desulfurizer heated to about 150° C. to 400° C. with heat transfer from an internal casing.

As another example, in a technique described in Japanese Unexamined Patent Application Publication No. 2013-229120, a desulfurizer heating unit through which combustion exhaust gas flows is provided outside a hydro-desulfurizer so as to heat the hydro-desulfurizer, and the raw material gas which is to enter the hydro-desulfurizer exchanges heat with the raw material gas discharged from the hydro-desulfurizer. The raw material gas can thereby be pre-heated before it enters the hydro-desulfurizer and also the hydro-desulfurizing agent in the hydro-desulfurizer can be kept at an appropriate temperature.

Japanese Unexamined Patent Application Publication No. 2010-272333 describes a technique in which a hydro-desulfurizer is accommodated in a jacket and combustion exhaust gas flows through the jacket.

SUMMARY

The conventional techniques, however, do not sufficiently address the facilitation of temperature control in the hydro-desulfurizer. They do not sufficiently consider reduction of the heating-up time for the hydro-desulfurizer and unevenness in temperature in the hydro-desulfurizer either.

One non-limiting and exemplary embodiment provides a fuel cell system that can facilitate temperature control in a hydro-desulfurizer and also reduce the heating-up time for the hydro-desulfurizer and unevenness in temperature in the hydro-desulfurizer compared to conventional techniques.

In one general aspect, the techniques disclosed here feature a fuel cell system including: a hydro-desulfurizer that removes a sulfur compound in raw material gas; a raw material gas heating unit that heats raw material gas before the raw material gas enters the hydro-desulfurizer; a reformer that generates reformed gas using the raw material gas that has passed through the hydro-desulfurizer; a fuel cell that generates electric power using the reformed gas from the reformer as fuel; a combustor that combusts fuel unused in the fuel cell; an exhaust gas channel through which exhaust gas generated in the combustor flows; and a housing that is provided in a part of the exhaust gas channel and houses the raw material gas heating unit and the hydro-desulfurizer, in which exhaust gas flowing through the housing undergoes heat exchange with the raw material gas heating unit and the hydro-desulfurizer.

The fuel cell system according to an aspect of the present disclosure is configured as described above, and can facilitate temperature control in a hydro-desulfurizer and also reduce the heating-up time for the hydro-desulfurizer and unevenness in temperature in the hydro-desulfurizer compared to conventional techniques.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiment 1

Figure 1:
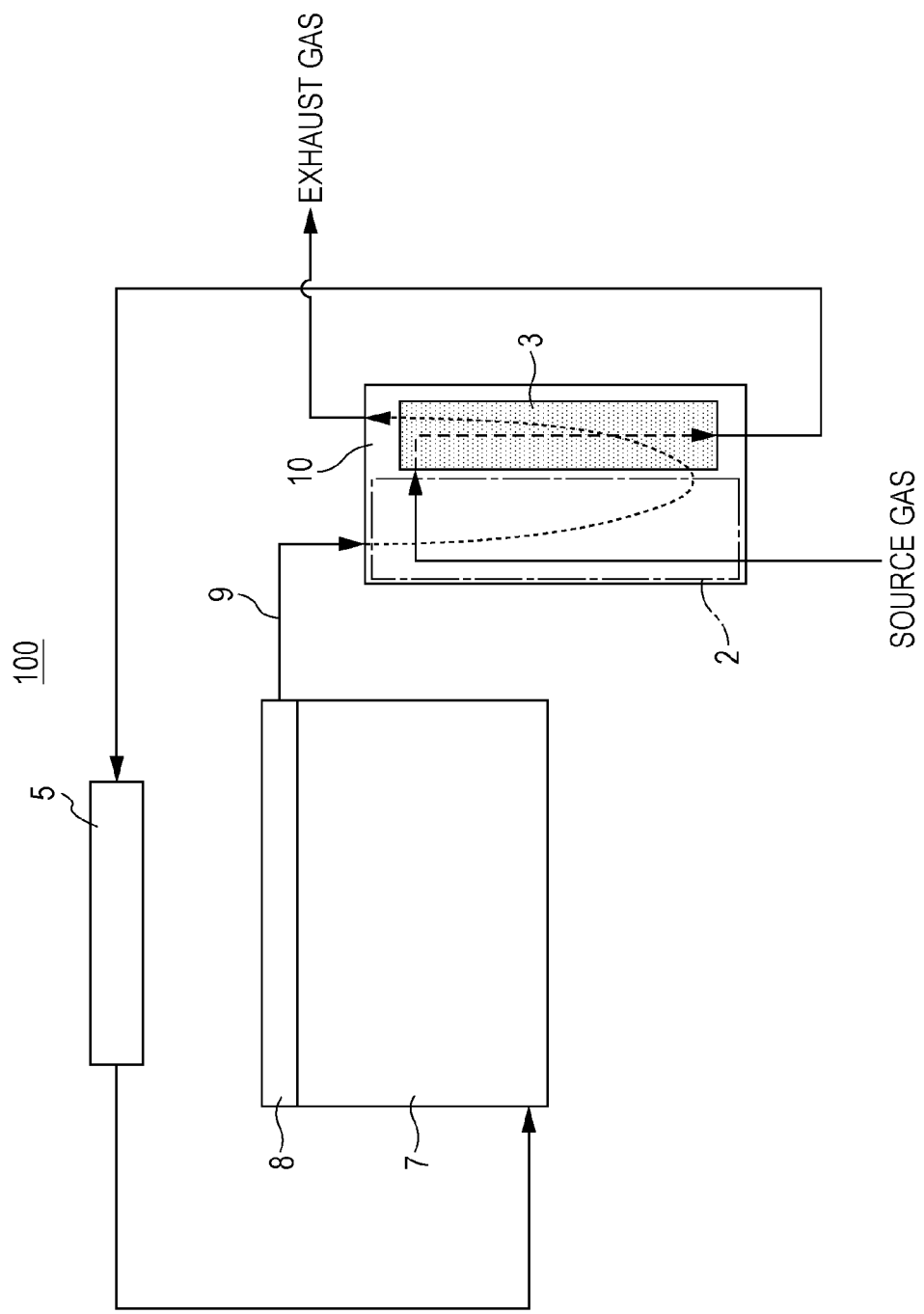
FIG. 1 illustrates an example of the fuel cell system in Embodiment 1.

The inventors have obtained the following findings after researching into facilitation of temperature control in the hydro-desulfurizer as well as reduction of the heating-up time for the hydro-desulfurizer and unevenness in temperature in it.

Since Japanese Unexamined Patent Application Publication No. 2011-216308 implements temperature control in the hydro-desulfurizer with heat transfer from an internal casing, problems such as excessive increase in the temperature of the hydro-desulfurizer are difficult to prevent.

Japanese Unexamined Patent Application Publication No. 2013-229120 provides the hydro-desulfurizer separately from the desulfurizer heating unit, and so temperature increase in the hydro-desulfurizer is slow and the temperature tends to be uneven. Also, in an arrangement in which the raw material gas to be fed to the hydro-desulfurizer undergoes heat exchange with the raw material gas discharged from the hydro-desulfurizer, the quantity of heat is not sufficient for heating the raw material gas to a temperature appropriate for hydrogenation reaction in the hydro-desulfurizer (200° C. or higher, for example).

In Japanese Unexamined Patent Application Publication No. 2010-272333, since raw material gas of low temperature is likely to enter the hydro-desulfurizer, the temperature in the hydro-desulfurizer tends to be uneven.

Therefore, the fuel cell system according to Embodiment 1 of the present disclosure includes: a hydro-desulfurizer that removes a sulfur compound in raw material gas; a raw material gas heating unit that heats raw material gas before the raw material gas enters the hydro-desulfurizer; a reformer that generates reformed gas using the raw material gas that has passed through the hydro-desulfurizer; a fuel cell that generates electric power using the reformed gas from the reformer as fuel; a combustor that combusts fuel unused in the fuel cell; an exhaust gas channel through which exhaust gas generated in the combustor flows; and a housing that is provided in a part of the exhaust gas channel and houses the raw material gas heating unit and the hydro-desulfurizer, in which exhaust gas flowing through the housing undergoes heat exchange with the raw material gas heating unit and the hydro-desulfurizer.

Being thus configured, the fuel cell system can facilitate temperature control in the hydro-desulfurizer and also reduce the heating-up time for the hydro-desulfurizer and unevenness in temperature in the hydro-desulfurizer compared to conventional techniques. For example, since the hydro-desulfurizer can be directly heated with the heat of exhaust gas, the heating-up time for the hydro-desulfurizer and unevenness in temperature in it can be decreased. The raw material gas can also be directly heated with the heat of exhaust gas before the raw material gas enters the hydro-desulfurizer, so that a sufficient quantity of heat for heating the raw material gas to an appropriate temperature before it enters the hydro-desulfurizer can be gained.

[Device Structure]

FIG. 1 illustrates an example of the fuel cell system in Embodiment 1.

As shown in FIG. 1, a fuel cell system 100 in this embodiment includes a raw material gas heating unit 2, a hydro-desulfurizer 3, a reformer 5, a fuel cell 7, a combustor 8, an exhaust gas channel 9, and a housing 10.

The hydro-desulfurizer 3 removes sulfur compounds in raw material gas. The hydro-desulfurizer 3 is formed of a container filled with a hydro-desulfurizing agent. The hydro-desulfurizing agent may be a hydrogenation catalyst containing copper and zinc, for example. The hydro-desulfurizing agent is not limited to this example; a catalyst combining a Ni—Mo or Co—Mo catalyst with a zinc oxide catalyst may also be used. When a hydro-desulfurizing agent containing copper and zinc is used, the temperature range for an effective operation of the hydro-desulfurizer 3 is from about 150° C. to 350° C.

The reformer 5 generates reformed gas using raw material gas that has passed through the hydro-desulfurizer 3. More specifically, in the reformer 5, the raw material gas undergoes a reforming reaction to produce hydrogen-containing gas. The reforming reaction may be of any kind, such as steam reforming reaction, autothermal reaction, and partial oxidation reforming reaction, for example. For realizing an efficient operation of the fuel cell system, however, the system may be designed so that steam reforming reaction as well as partial oxidation reaction can be performed. In the case in which the reforming reaction is steam reforming reaction, an evaporator for generating water vapor, a water feeder for supplying water to the evaporator, and the like may be provided. Steam reforming reaction is excellent in efficiency because it can generate more hydrogen than partial oxidation reforming reaction from the same amount of raw material gas, but it requires supplement of heat because it is an endothermic reaction. For the heat to be supplemented, radiant heat from the combustor 8 may be utilized, for example. The raw material gas is a gas that contains an organic compound composed at least of carbon and hydrogen, such as town gas composed primarily of methane, natural gas, and LPG. The reforming catalyst for the reformer 5 may be a catalyst with Ni impregnated onto and supported on a spherical surface of Al2O3 (alumina), or a catalyst with ruthenium applied on a spherical surface of Al2O3, for instance. The reformed gas generated in the reformer 5 is supplied to the fuel cell 7 through a reformed gas channel.

The fuel cell 7 generates electric power using the reformed gas from the reformer 5 as fuel. More specifically, the fuel cell 7 generates electricity by power generating reaction using reformed gas from the reformer 5 and air from the outside. The fuel cell 7 can be any type of fuel cell. Examples of the fuel cell 7 include a polymer electrolyte fuel cell, a molten carbonate fuel cell, and a solid oxide fuel cell, for example. When the fuel cell 7 generates power at high temperature (600° C. or higher, for example), a solid oxide fuel cell and a molten carbonate fuel cell are more appropriate to use. Although a fuel cell could generate power only with internal reforming of raw material gas in the electrodes of the fuel cell, it is desirable to include a reformer in the interest of durability of the fuel cell. The following description thus will illustrate a system arrangement that uses a solid oxide fuel cell as the fuel cell 7 and includes a reformer.

The combustor 8 combusts fuel unused in the fuel cell 7. The combustor 8 may be any mechanism that can burn fuel unused in the fuel cell 7. The combustor 8 may be a combustion burner, for instance. The fuel for the combustor 8 may be anode off-gas discharged from the fuel cell 7, for example.

The exhaust gas channel 9 is a route through which the exhaust gas generated in the combustor 8 flows. The housing 10 is provided in a part of the exhaust gas channel 9 and houses the raw material gas heating unit 2 and the hydro-desulfurizer 3. More specifically, the housing 10 has an exhaust gas inlet and an exhaust gas outlet and forms a part of the exhaust gas channel 9 so that exhaust gas flows through the housing 10. In this embodiment, as shown in FIG. 1, the hydro-desulfurizer 3 is disposed near the exhaust gas outlet in the housing 10 and the raw material gas heating unit 2 is disposed near the exhaust gas inlet in the housing 10.

The raw material gas heating unit 2 heats raw material gas before it enters the hydro-desulfurizer 3. Specifically, the exhaust gas flowing through the housing 10 exchanges heat with the raw material gas heating unit 2 and the hydro-desulfurizer 3. The raw material gas is thereby heated before it enters the hydro-desulfurizer 3 by heat exchange with the exhaust gas in the raw material gas heating unit 2. After being heated, the raw material gas enters the hydro-desulfurizer 3. The hydro-desulfurizing agent in the hydro-desulfurizer 3 is also heated by heat exchange with exhaust gas.

With the foregoing arrangement, temperature control in the hydro-desulfurizer 3 can be facilitated and also the heating-up time for the hydro-desulfurizer 3 and unevenness in temperature in it can be reduced compared to conventional arts. For example, since the hydro-desulfurizer 3 can be directly heated with the heat of exhaust gas, the heating-up time for the hydro-desulfurizer 3 and unevenness in temperature in it can be reduced. In addition, since raw material gas can be directly heated with the heat of exhaust gas before the raw material gas enters the hydro-desulfurizer 3, a sufficient quantity of heat for heating the raw material gas to an appropriate temperature prior to its entry into the hydro-desulfurizer 3 can be obtained. This embodiment therefore can reduce the possibility of a low temperature portion occurring in the hydro-desulfurizer 3 to result in a reduction in its performance, which can be the case in a conventional practice when insufficiently heated raw material gas enters the hydro-desulfurizer 3, for example.

Example 1

The fuel cell system in Example 1 is the fuel cell system according to Embodiment 1, in which the raw material gas heating unit includes a raw material gas conduit through which raw material gas flows, and the exhaust gas flows between the raw material gas conduit and the hydro-desulfurizer.

With this arrangement, exhaust gas flowing through the housing can effectively exchange heat with the raw material gas conduit and the hydro-desulfurizer.

Except for the foregoing, the fuel cell system of Example 1 may have a similar structure to the fuel cell system in Embodiment 1.

[Device Structure]

Figure 2:
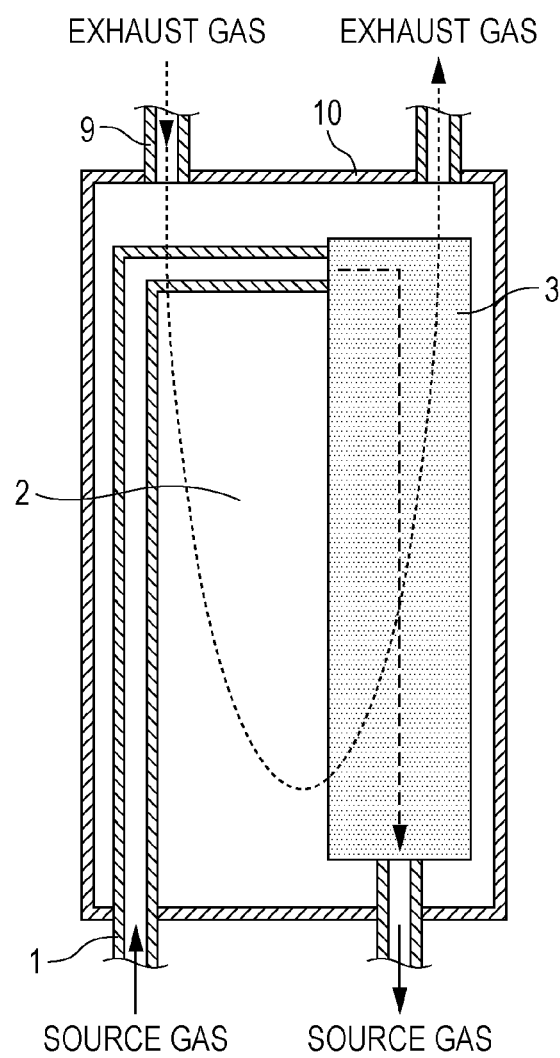
FIG. 2 illustrates an example of a housing for use in the fuel cell system in Example 1 of Embodiment 1.

FIG. 2 illustrates an example of a housing for use in the fuel cell system in Example 1 of Embodiment 1.

As depicted in FIG. 2, the raw material gas heating unit 2 in the housing 10 has a raw material gas conduit 1 in which raw material gas flows. The exhaust gas flows between the raw material gas conduit 1 and the hydro-desulfurizer 3. This enables exhaust gas flowing through the housing 10 to effectively exchange heat with the raw material gas conduit 1 and the hydro-desulfurizer 3.

Example 2

The fuel cell system in Example 2 is the fuel cell system according to Embodiment 1 or Example 1 of Embodiment 1, in which the exhaust gas in the housing undergoes heat exchange with the raw material gas in the raw material gas heating unit and subsequently undergoes heat exchange with the hydro-desulfurizer.

With this arrangement, the temperature of the raw material gas can be sufficiently increased before it enters the hydro-desulfurizer with exhaust gas of high temperature.

Except for the foregoing, the fuel cell system of Example 2 may have a similar structure to the fuel cell system in Embodiment 1 or Example 1 of Embodiment 1.

[Device Structure]

The fuel cell system 100 in Example 2 has a similar structure to FIG. 1; it includes the raw material gas heating unit 2, the hydro-desulfurizer 3, the reformer 5, the fuel cell 7, the combustor 8, the exhaust gas channel 9, and the housing 10. As the structure is similar to Embodiment 1, description of the same is omitted.

As shown in FIG. 1, in Example 2, exhaust gas in the housing 10 first undergoes heat exchange with raw material gas in the raw material gas heating unit 2. Thereafter, the exhaust gas undergoes heat exchange with the hydro-desulfurizer 3.

With this arrangement, the temperature of the raw material gas can be sufficiently increased before it enters the hydro-desulfurizer 3 with exhaust gas of high temperature.

Embodiment 2

The fuel cell system in this embodiment is the fuel cell system according to any one of Embodiment 1, and Example 1 and Example 2 of Embodiment 1, in which the housing includes at least one partition component disposed between the raw material gas heating unit and the hydro-desulfurizer, and the exhaust gas flows so as to turn around at an end of the partition component.

Since this arrangement can guide exhaust gas along the partition component in contrast to when no partition component is provided in the housing, heat exchange between the raw material gas in the raw material gas heating unit and the exhaust gas flowing through the housing is facilitated, making it easier to increase the temperature of raw material gas before it enters the hydro-desulfurizer.

Except for the foregoing, the fuel cell system in this embodiment may have a similar structure to the fuel cell system according to any one of Embodiment 1, and Example 1 and Example 2 of Embodiment 1.

[Device Structure]

Figure 3:
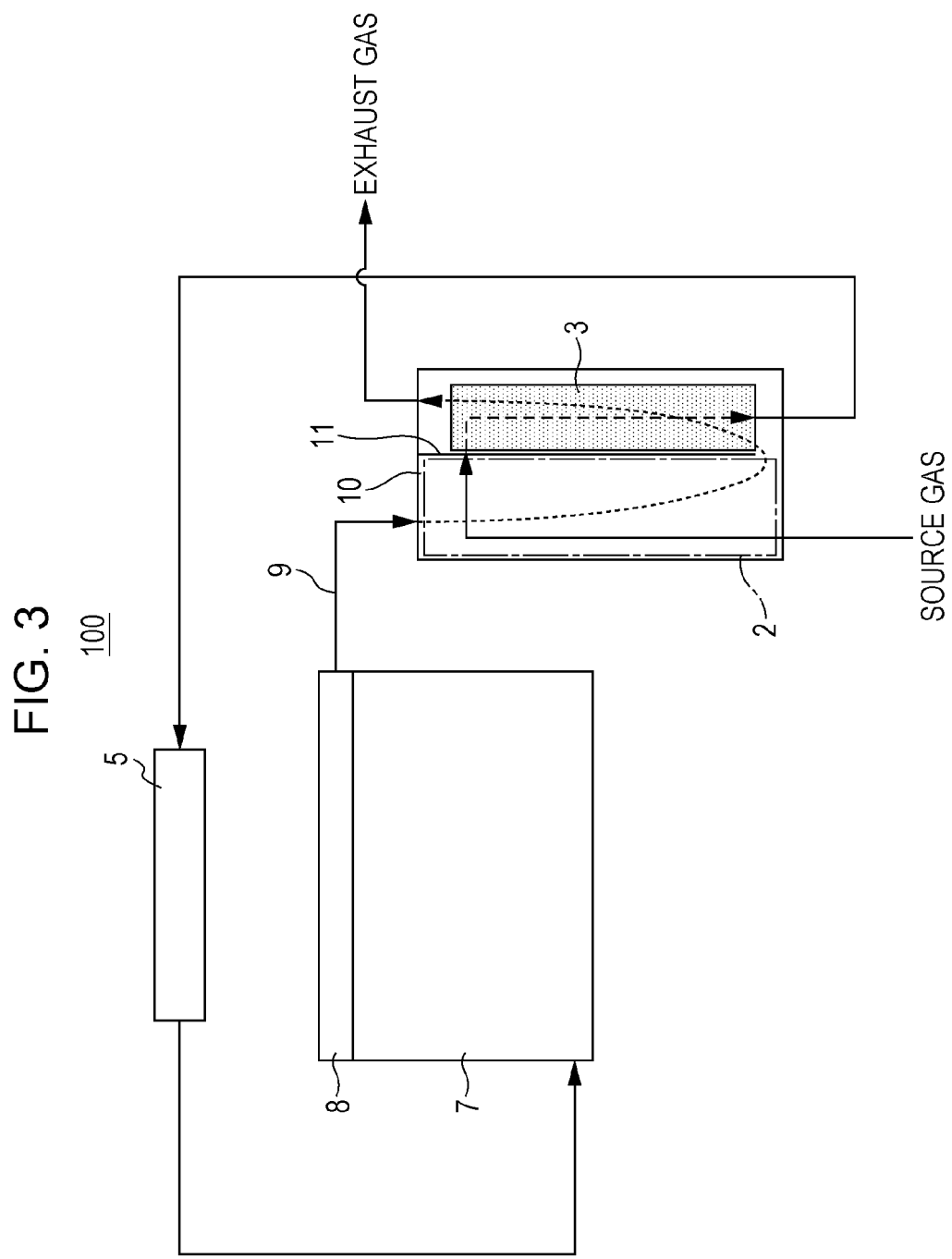
FIG. 3 illustrates an example of the fuel cell system in Embodiment 2.

FIG. 3 illustrates an example of the fuel cell system in Embodiment 2.

As shown in FIG. 3, the fuel cell system 100 in this embodiment includes the raw material gas heating unit 2, the hydro-desulfurizer 3, the reformer 5, the fuel cell 7, the combustor 8, the exhaust gas channel 9, the housing 10, and a partition component 11. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The partition component 11 is disposed between the raw material gas heating unit 2 and the hydro-desulfurizer 3. Exhaust gas flows such that it turns around at an end of the partition component 11. In this embodiment, the upper end of the tabular partition component 11 is welded to the inner wall surface of the housing 10 and a passage for exhaust gas is formed between the surface of the lower end of the partition component 11 and the inner wall of the housing 10 as shown in FIG. 3.

With the foregoing arrangement, exhaust gas can be guided along the partition component 11 in contrast to when the partition component 11 is not provided in the housing 10, and so heat exchange between the raw material gas in the raw material gas heating unit 2 and the exhaust gas flowing through the housing 10 is facilitated, making it easier to increase the temperature of raw material gas before it enters the hydro-desulfurizer 3.

Embodiment 3

The fuel cell system in this embodiment is the fuel cell system according to any one of Embodiment 1, Example 1 and Example 2 of Embodiment 1, and Embodiment 2, in which the flow of the exhaust gas in the housing and the flow of the raw material gas in the raw material gas heating unit are substantially counter to each other at least once.

With this arrangement, the temperature of the raw material gas prior to entering the hydro-desulfurizer is easy to increase because counter flows have higher heat transfer performance in heat exchange than cross flows or parallel flows.

Except for the foregoing, the fuel cell system in this embodiment may have a similar structure to the fuel cell system according to any one of Embodiment 1, Example 1 and Example 2 of Embodiment 1, and Embodiment 2.

[Device Structure]

The fuel cell system 100 in this embodiment has a similar structure to FIG. 1; it includes the raw material gas heating unit 2, the hydro-desulfurizer 3, the reformer 5, the fuel cell 7, the combustor 8, the exhaust gas channel 9, and the housing 10. As the structure is similar to Embodiment 1, description of the same is omitted.

As illustrated in FIG. 1, in this embodiment, exhaust gas in the housing 10 flows from top to bottom and raw material gas flows from bottom to top in the raw material gas heating unit 2. Thus, the flow of exhaust gas in the housing 10 and the flow of raw material gas in the raw material gas heating unit 2 are substantially counter to each other.

This facilitates increasing the temperature of raw material gas prior to entering the hydro-desulfurizer 3 because counter flows have higher heat transfer performance in heat exchange than cross flows or parallel flows. This embodiment can reduce the possibility that the temperature of the raw material gas is not sufficiently increased before entering the hydro-desulfurizer 3, which can be the case when a sufficient distance in the flowing direction of raw material gas in the raw material gas heating unit 2 cannot be reserved relative to the flow rate of the raw material gas, for example.

Embodiment 4

The fuel cell system in this embodiment is the fuel cell system according to any one of Embodiment 1, Example 1 and Example 2 of Embodiment 1, and Embodiment 2, in which the flow of the exhaust gas in the housing and the flow of the raw material gas in the raw material gas heating unit are substantially counter and substantially parallel to each other at least once respectively.

With this arrangement, this embodiment can reduce the possibility that the temperature of the raw material gas is not sufficiently increased before entering the hydro-desulfurizer when a sufficient distance in the direction in which raw material gas flows in the raw material gas heating unit cannot be reserved relative to the flow rate of raw material gas.

Except for the foregoing, the fuel cell system in this embodiment may have a similar structure to the fuel cell system according to any one of Embodiment 1, Example 1 and Example 2 of Embodiment 1, and Embodiment 2.

[Device Structure]

Figure 4:
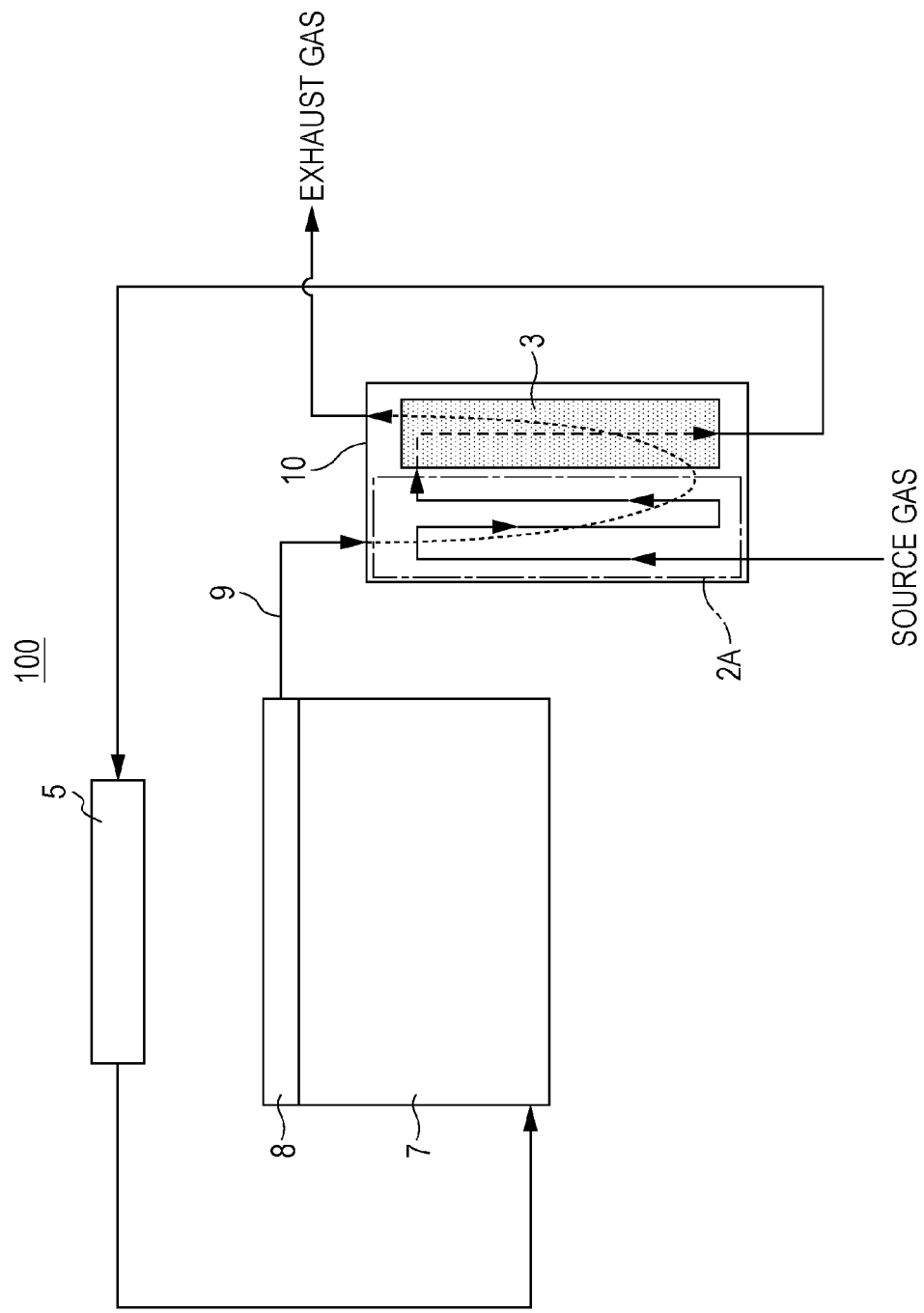
FIG. 4 illustrates an example of the fuel cell system in Embodiment 4.

FIG. 4 illustrates an example of the fuel cell system in Embodiment 4.

As illustrated in FIG. 4, the fuel cell system 100 in this embodiment includes a raw material gas heating unit 2A, the hydro-desulfurizer 3, the reformer 5, the fuel cell 7, the combustor 8, the exhaust gas channel 9, and the housing 10. As the hydro-desulfurizer 3, reformer 5, fuel cell 7, combustor 8, exhaust gas channel 9, and housing 10 are similar to Embodiment 1, descriptions of them are omitted.

In this embodiment, the raw material gas channel in the raw material gas heating unit 2A is formed as a tortuous or serpentine path which turns around in the upper and bottom portions of the housing 10, and is connected to the hydro-desulfurizer 3 as shown in FIG. 4.

Also as shown in FIG. 4, in this embodiment, exhaust gas in the housing 10 flows from top to bottom, while raw material gas flows from bottom to top, then from top to bottom in the raw material gas heating unit 2A. Thus, the flow of exhaust gas in the housing 10 and the flow of raw material gas in the raw material gas heating unit 2A are substantially counter and also substantially parallel to each other.

This embodiment thereby can reduce the possibility that the temperature of the raw material gas is not sufficiently increased before entering the hydro-desulfurizer 3, which can be the case when a sufficient distance in the flowing direction of the raw material gas in the raw material gas heating unit 2A cannot be reserved relative to the flow rate of the raw material gas. This is because, since counter flows have higher heat transfer performance in heat exchange than cross flows or parallel flows, increase in the temperature of the raw material gas before entering the hydro-desulfurizer 3 is facilitated. Additionally, since a sufficient heat transfer area for heat exchange of raw material gas can be reserved without increasing the length of the raw material gas heating unit 2A in the flowing direction of raw material gas, increase of the temperature of the raw material gas before entering the hydro-desulfurizer 3 is facilitated.

Embodiment 5

The fuel cell system in this embodiment is the fuel cell system according to any one of Embodiment 1, Example 1 and Example 2 of Embodiment 1, and Embodiments 2 through 4, in which the raw material gas in the hydro-desulfurizer flows in a substantially vertical direction.

When the hydro-desulfurizing agent used in the hydro-desulfurizer is in a pellet form, the hydro-desulfurizing agent can become powdery due to effects of heat load. If the hydro-desulfurizer is installed sideways in such a situation, the powder of the hydro-desulfurizing agent would collect in the lower portion of the hydro-desulfurizer due to the action of gravity, possibly resulting in an uneven flow of raw material gas. By passing raw material gas in the hydro-desulfurizer in a substantially vertical direction as mentioned above, this possibility can be decreased.

Except for the foregoing, the fuel cell system in this embodiment may have a similar structure to the fuel cell system according to any one of Embodiment 1, Example 1 and Example 2 of Embodiment 1, and Embodiments 2 through 4.

[Device Structure]

Figure 5:
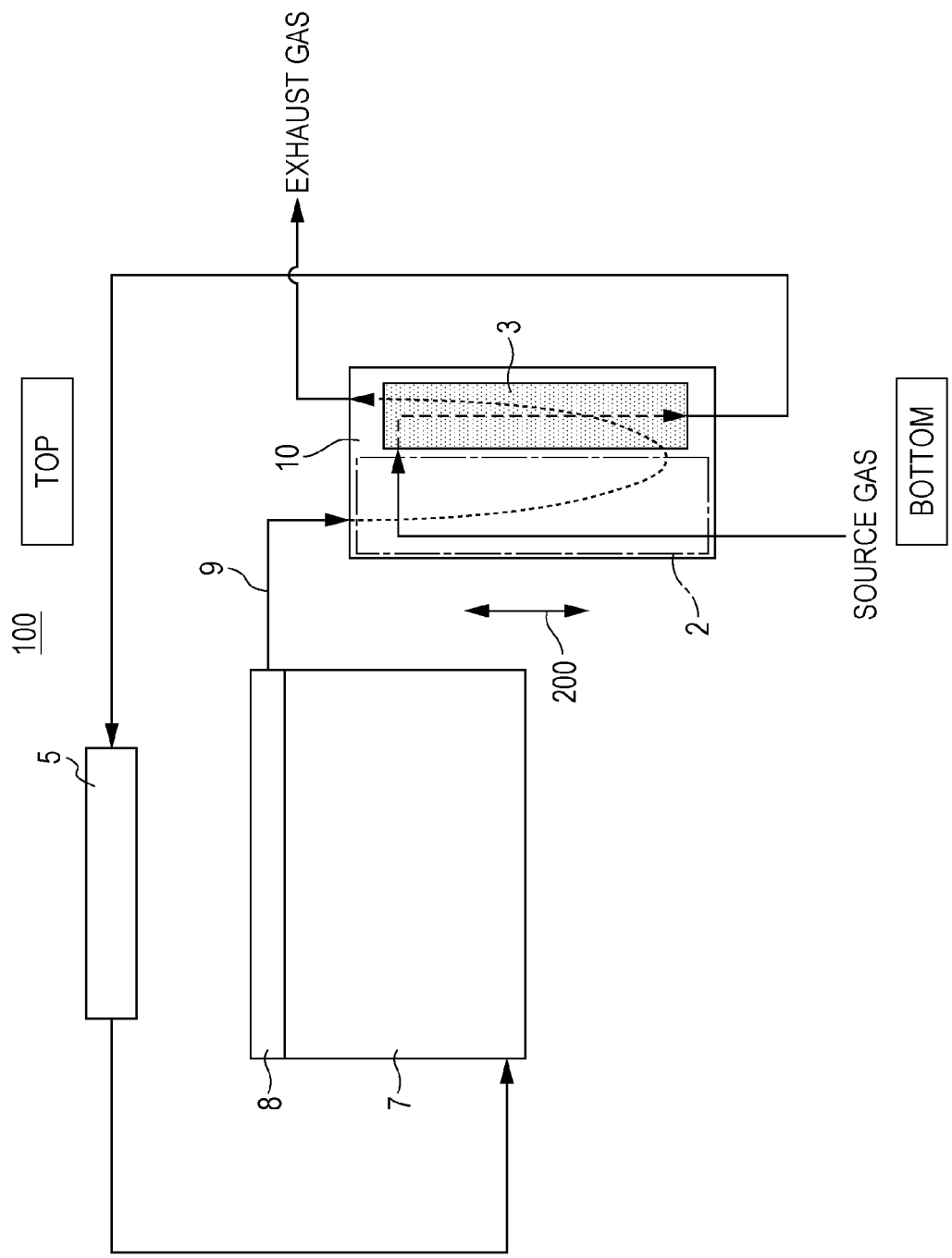
FIG. 5 illustrates an example of the fuel cell system in Embodiment 5.

FIG. 5 illustrates an example of the fuel cell system in Embodiment 5. Suppose that gravity acts from top to bottom in FIG. 5.

The fuel cell system 100 in this embodiment has a similar structure to FIG. 1; it includes the raw material gas heating unit 2, the hydro-desulfurizer 3, the reformer 5, the fuel cell 7, the combustor 8, the exhaust gas channel 9, and the housing 10. As the structure is similar to Embodiment 1, description of the same is omitted.

As shown in FIG. 5, in this embodiment, raw material gas in the hydro-desulfurizer 3 flows substantially in a vertical direction 200. That is, the raw material gas may flow either from top to bottom in the hydro-desulfurizer 3 as illustrated in FIG. 5 or, although not shown, from bottom to top. This is because of the following reason.

When the hydro-desulfurizing agent used in the hydro-desulfurizer 3 is in a pellet form, the hydro-desulfurizing agent can become powdery due to effects of heat load. If the hydro-desulfurizer 3 is installed sideways in such a situation, the powder of the hydro-desulfurizing agent would collect in the lower portion of the hydro-desulfurizer 3 due to the action of gravity, possibly resulting in an uneven flow of raw material gas. By passing raw material gas in the hydro-desulfurizer 3 in the substantially vertical direction 200 as mentioned above, this possibility can be decreased.

Embodiment 6

The fuel cell system in this embodiment is the fuel cell system according to any one of Embodiment 1, Example 1 and Example 2 of Embodiment 1, and Embodiments 2 through 5, in which the hydro-desulfurizer includes a plurality of hydro-desulfurizing units and a connection that connects between neighboring hydro-desulfurizing units, and the raw material gas flows so as to turn around in the connection.

With this arrangement, raw material gas that has passed through the hydro-desulfurizing unit which is on the upstream side in the flowing direction of the raw material gas can be mixed in the connection. Accordingly, raw material gas that has not been desulfurized in the upstream hydro-desulfurizing unit is more likely to be desulfurized when it passes through the hydro-desulfurizing unit on the downstream side.

Except for the foregoing, the fuel cell system in this embodiment may have a similar structure to the fuel cell system according to any one of Embodiment 1, Example 1 and Example 2 of Embodiment 1, and Embodiments 2 through 5.

[Device Structure]

Figure 6:
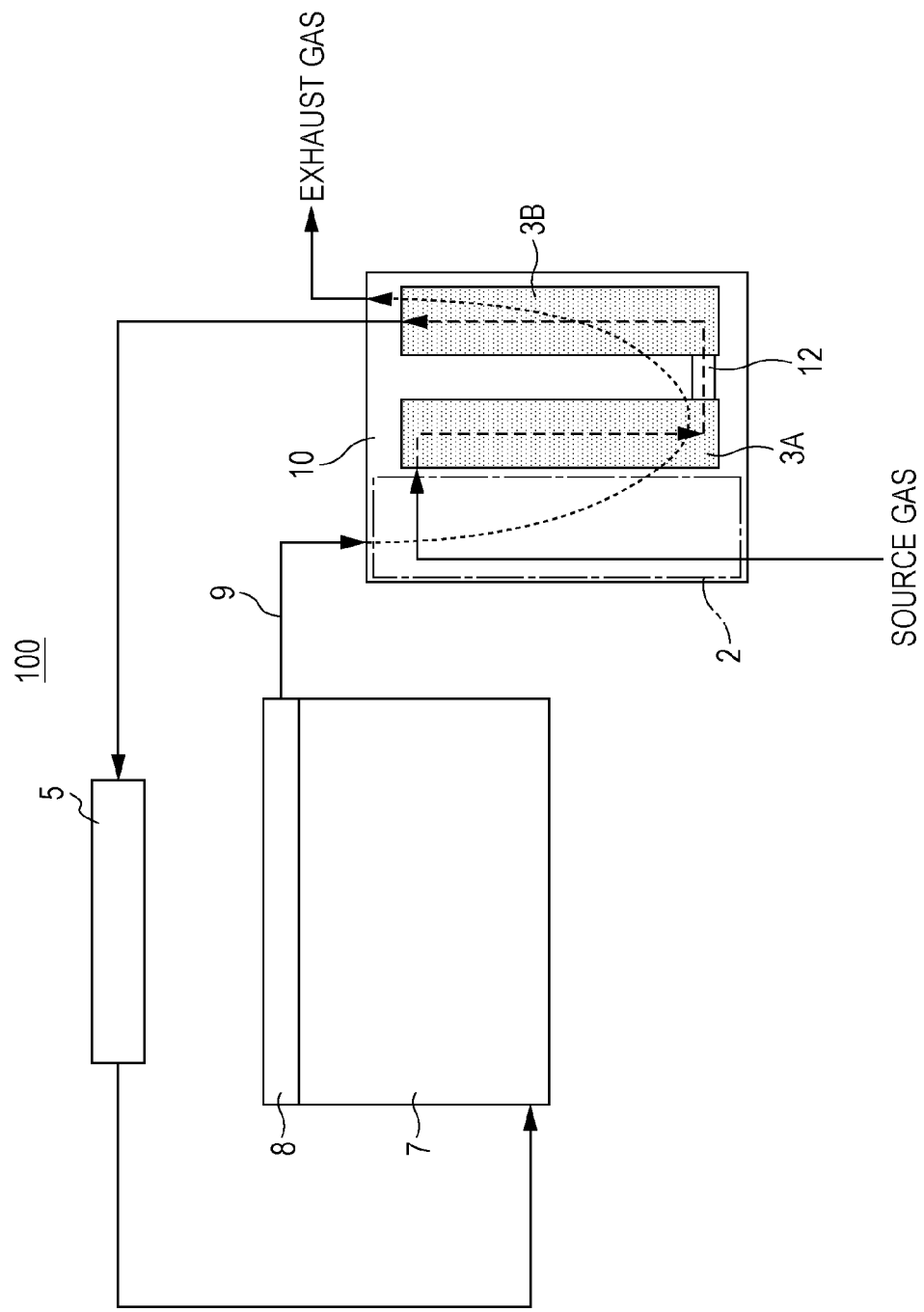
FIG. 6 illustrates an example of the fuel cell system in Embodiment 6.

FIG. 6 illustrates an example of the fuel cell system in Embodiment 6.

As illustrated in FIG. 6, the fuel cell system 100 in this embodiment includes the raw material gas heating unit 2, a hydro-desulfurizing unit 3A, a hydro-desulfurizing unit 3B, a connection 12, the reformer 5, the fuel cell 7, the combustor 8, the exhaust gas channel 9, and the housing 10. As the raw material gas heating unit 2, reformer 5, fuel cell 7, combustor 8, exhaust gas channel 9, and housing 10 are similar to Embodiment 1, descriptions of them are omitted.

The hydro-desulfurizer includes multiple hydro-desulfurizing units 3A and 3B, and the connection 12 that connects between the neighboring hydro-desulfurizing units 3A and 3B. The raw material gas flows so as to turn around in the connection 12.

The connection 12 may be any kind of component that can connect between the neighboring hydro-desulfurizing units 3A and 3B. The connection 12 may be a pipe, for instance.

With the foregoing arrangement, raw material gas that has passed through the hydro-desulfurizing unit 3A on the upstream side in the flowing direction of raw material gas can be mixed in the connection 12. Accordingly, raw material gas that has not been desulfurized in the upstream hydro-desulfurizing unit 3A is more likely to be desulfurized when it passes through the downstream hydro-desulfurizing unit 3B.

(Variation)

The fuel cell system as a variation is the fuel cell system according to Embodiment 6, in which the housing includes at least one partition component disposed between the neighboring hydro-desulfurizing units, and the exhaust gas flows so as to turn around at an end of the partition component.

With this arrangement, exhaust gas can be guided along the partition component in contrast to when no partition component is provided in the housing, and so heat exchange between the raw material gas in the raw material gas heating unit and the exhaust gas flowing through the housing is facilitated, making it easy to increase the temperature of raw material gas before it enters the hydro-desulfurizer.

Except for the foregoing, the fuel cell system in this variation may have a similar structure to the fuel cell system according to Embodiment 6.

[Device Structure]

Figure 7:
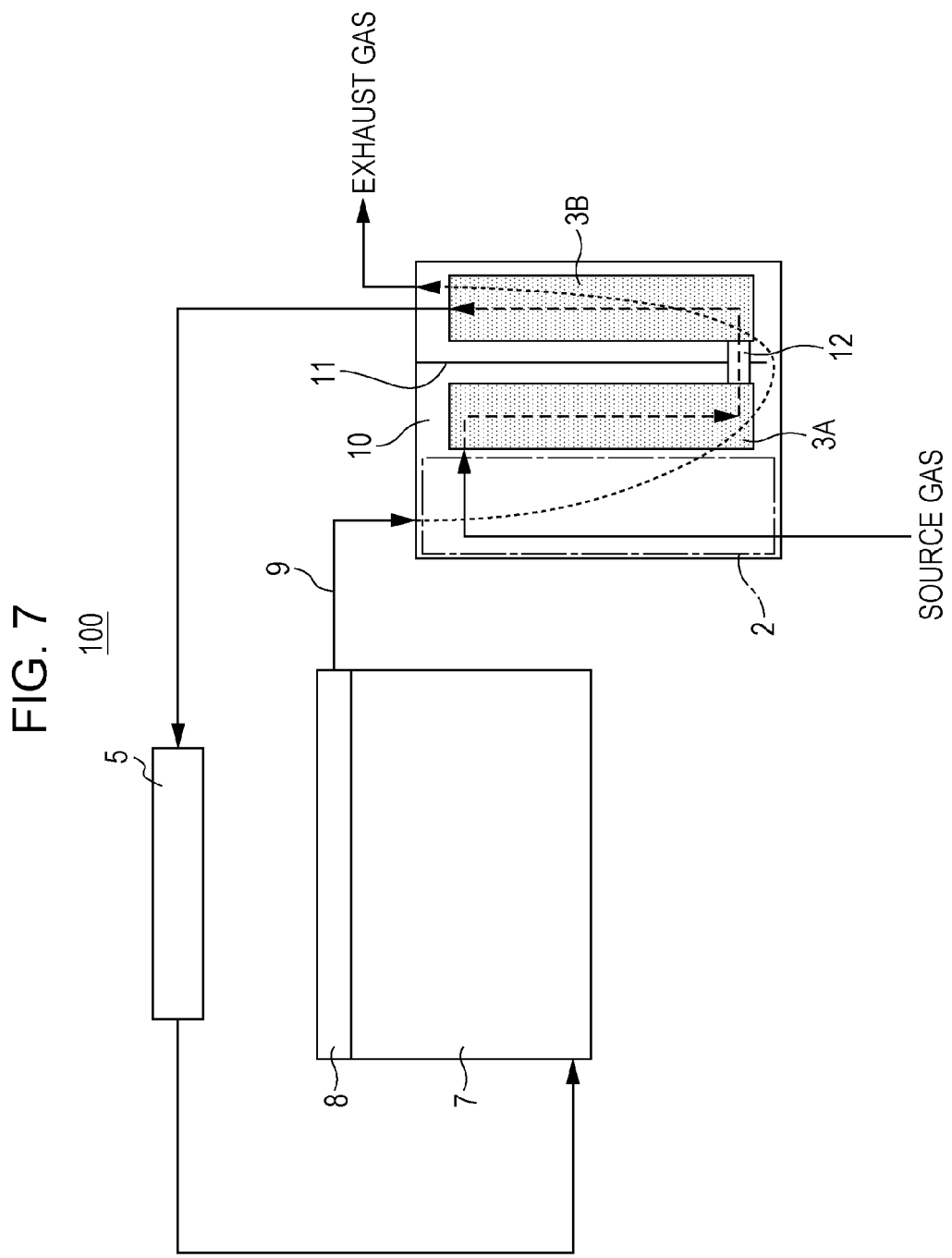
FIG. 7 illustrates an example of the fuel cell system as a variation of Embodiment 6.

FIG. 7 illustrates an example of the fuel cell system as a variation of Embodiment 6.

As shown in FIG. 7, the fuel cell system 100 in this variation includes the raw material gas heating unit 2, the hydro-desulfurizing unit 3A, the hydro-desulfurizing unit 3B, the connection 12, the reformer 5, the fuel cell 7, the combustor 8, the exhaust gas channel 9, the housing 10, and the partition component 11. As the raw material gas heating unit 2, hydro-desulfurizing unit 3A, hydro-desulfurizing unit 3B, reformer 5, fuel cell 7, combustor 8, exhaust gas channel 9, and housing 10 are similar to Embodiment 6, descriptions of them are omitted.

The partition component 11 is disposed between the neighboring hydro-desulfurizing units 3A and 3B. Exhaust gas flows so as to turn around at an end of the partition component 11. In this variation, the upper end of the tabular partition component 11 is welded to the inner wall surface of the housing 10, and a passage for exhaust gas is formed between the surface of the lower end of the partition component 11 and the inner wall of the housing 10 as illustrated in FIG. 7. The connection 12 is disposed through the partition component 11 in its lower end.

With the foregoing arrangement, exhaust gas can be guided along the partition component 11 in contrast to when the partition component 11 is not provided in the housing 10, and so heat exchange between the raw material gas heating unit 2 and the exhaust gas flowing through the housing 10 is facilitated, making it easier to increase the temperature of raw material gas before it enters the hydro-desulfurizer 3A.

An additional partition component (not shown) may be provided between the raw material gas heating unit 2 and the hydro-desulfurizing unit 3A. In such an arrangement, the upper end of the partition component between the raw material gas heating unit 2 and the hydro-desulfurizing unit 3A may be welded to the inner wall surface of the housing 10, and a passage for exhaust gas may be formed between the surface of the lower end of the partition component and the inner wall of the housing 10. Meanwhile, the lower end of the partition component (not shown) between the neighboring hydro-desulfurizing units 3A and 3B may be welded to the inner wall surface of the housing 10, and a passage for exhaust gas may be formed between the surface of the upper end of the partition component and the inner wall of the housing 10. That is, the two partition components may be disposed in a staggered fashion in the vertical direction.

Embodiment 7

The fuel cell system in this embodiment is the fuel cell system according to any one of Embodiment 1, Example 1 and Example 2 of Embodiment 1, Embodiments 2 through 6, and the variation of Embodiment 6, in which the heat transfer rate of the wall of the hydro-desulfurizer is higher on the downstream side of the exhaust gas channel than on the upstream side.

In this arrangement, heat transfer of an amount equivalent to the upstream-side portion of the hydro-desulfurizer can be achieved in the downstream-side portion thereof by making the heat transfer rate of the downstream-side wall of the hydro-desulfurizer higher than its upstream-side wall with respect to the exhaust gas channel. Thus, a reduction in temperature of the downstream-side portion of the hydro-desulfurizer can be prevented. Unevenness in the temperature in the hydro-desulfurizer can be reduced as well.

Except for the foregoing, the fuel cell system in this embodiment may have a similar structure to the fuel cell system according to any one of Embodiment 1, Example 1 and Example 2 of Embodiment 1, Embodiments 2 through 6, and the variation of Embodiment 6.

[Device Structure]

Figure 8:
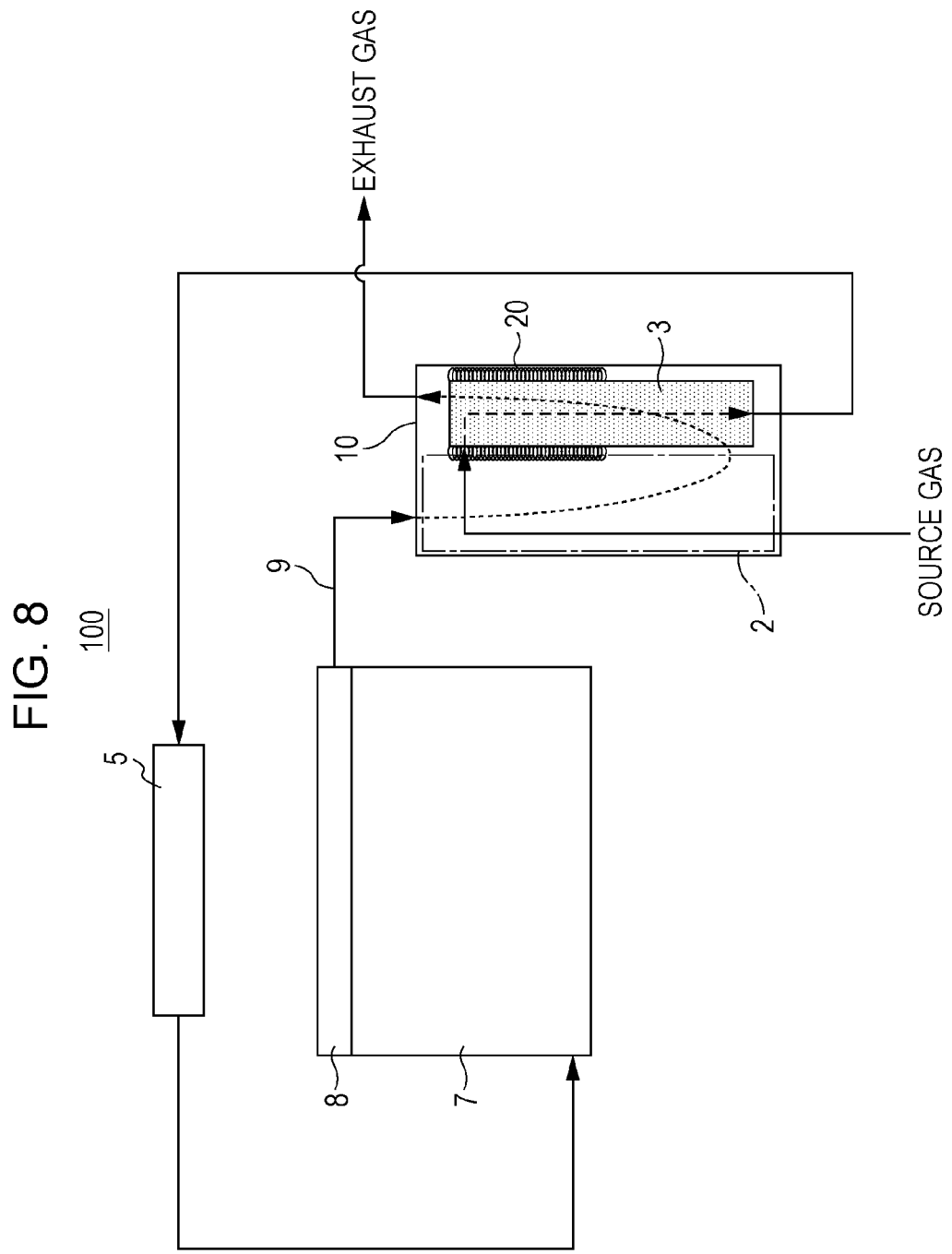
FIG. 8 illustrates an example of the fuel cell system in Embodiment 7.

FIG. 8 illustrates an example of the fuel cell system in Embodiment 7.

As illustrated in FIG. 8, the fuel cell system 100 in this embodiment includes the raw material gas heating unit 2, the hydro-desulfurizer 3, the reformer 5, the fuel cell 7, the combustor 8, the exhaust gas channel 9, the housing 10, and a heat transmission promoting member 20. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The heat transmission promoting member 20 is disposed around the wall of the hydro-desulfurizer 3 and has the function of increasing the heat transfer rate of the wall of the hydro-desulfurizer 3. More specifically, as depicted in FIG. 8, the heat transmission promoting member 20 is placed in the exhaust gas channel formed by the wall of the hydro-desulfurizer 3 and the inner wall of the housing 10.

The heat transmission promoting member 20 may be any kind of component that can increase the heat transfer rate of the wall of the hydro-desulfurizer 3. As an example, the heat transmission promoting member 20 may be metal wire mesh. This embodiment disposes wire mesh around the wall of the hydro-desulfurizer 3 such that the density of the wire mesh increases as it goes further downstream on the exhaust gas channel with respect to the hydro-desulfurizer 3. This is because of the following reason.

The temperature of exhaust gas flowing through the housing 10 is lower on the downstream side of the exhaust gas channel than on the upstream side.

Here, the amount of heat transfer Q from exhaust gas (the amount of heat transferred to the hydro-desulfurizer 3) can be represented by Equation (1) below.

$$Q = K \cdot A \cdot (Tf - TW) \quad (1)$$

where K is heat transfer rate [W/m²·K], A is heat transfer area [m²], Tf is the temperature of exhaust gas [° C.], and TW is the temperature of the outer surface of the wall of the hydro-desulfurizer 3.

As can be understood from Equation (1), the amount of heat transfer Q reduces as the exhaust gas temperature Tf decreases. The temperature of the downstream-side portion of the hydro-desulfurizer 3 is therefore lower than the upstream-side portion, and this causes unevenness of temperature in the hydro-desulfurizer 3.

To address this, this embodiment makes the heat transfer rate K of the downstream-side wall of the hydro-desulfurizer 3 higher than the heat transfer rate K of the upstream-side wall with respect to the exhaust gas channel by way of the action of the heat transmission promoting member 20 as mentioned above.

This enables an amount of heat transfer Q equivalent to the upstream-side portion of the hydro-desulfurizer 3 to be obtained in the downstream-side portion. Thus, a reduction in temperature of the downstream-side portion of the hydro-desulfurizer 3 can be prevented. Unevenness in the temperature in the hydro-desulfurizer 3 can be reduced as well.

Embodiment 8

The fuel cell system in this embodiment is the fuel cell system according to any one of Embodiment 1, Example 1 and Example 2 of Embodiment 1, Embodiments 2 through 6, the variation of Embodiment 6, and Embodiment 7, and includes a heater that heats the raw material gas heating unit and the heater is on/off-controllable.

With this arrangement, when the temperature of the hydro-desulfurizer is increased to an appropriate temperature within a short time at the startup of the fuel cell, for example, activation of the heater can reduce the possibility of insufficient heating ability of the raw material gas heating unit for heating through heat exchange with exhaust gas. After the hydro-desulfurizer has been heated to an appropriate temperature, the heater may be switched off to reduce power consumption.

Except for the foregoing, the fuel cell system in this embodiment may have a similar structure to the fuel cell system according to any one of Embodiment 1, Example 1 and Example 2 of Embodiment 1, Embodiments 2 through 6, the variation of Embodiment 6, and Embodiment 7.

[Device Structure]

Figure 9:
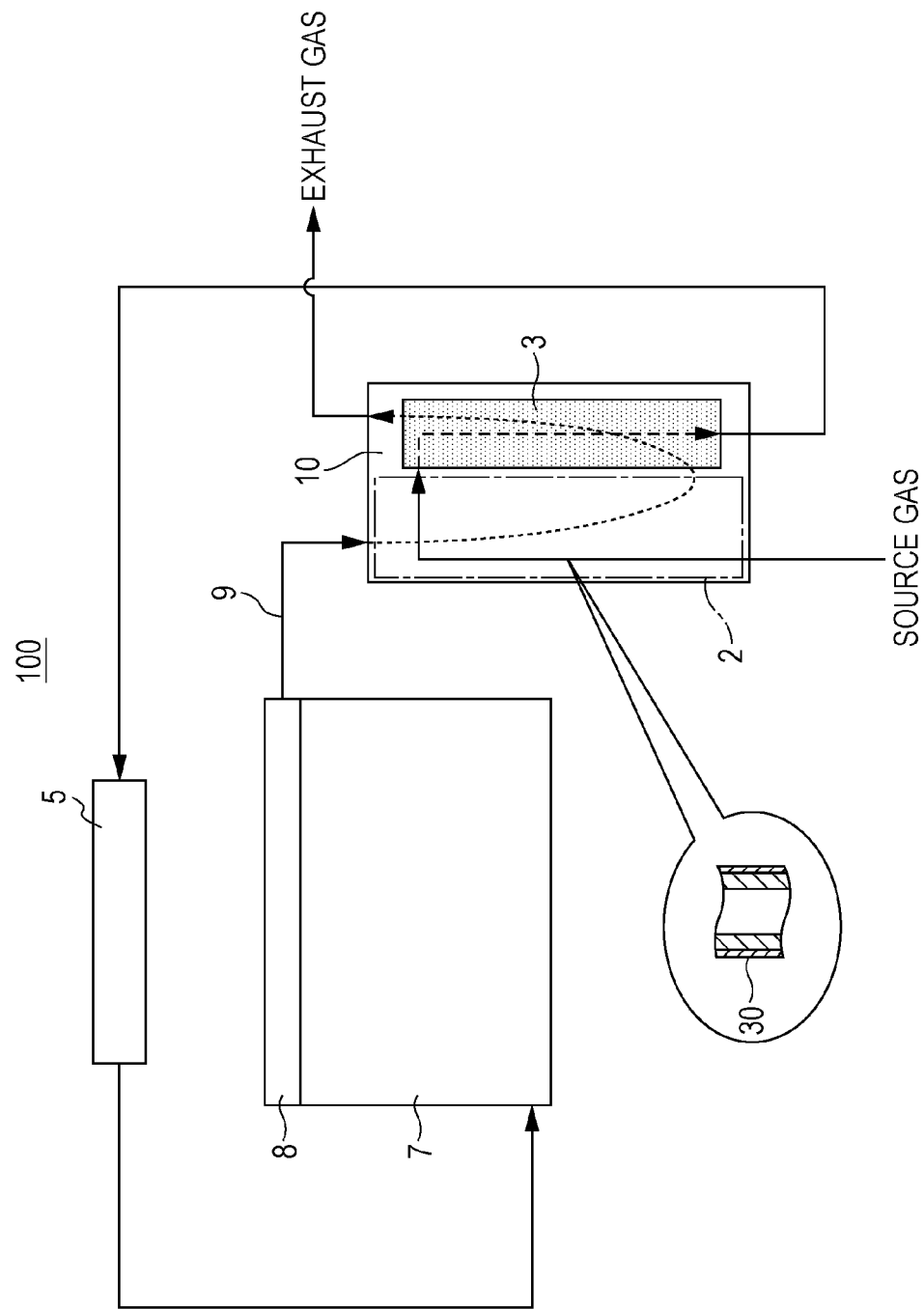
FIG. 9 illustrates an example of the fuel cell system in Embodiment 8.

FIG. 9 illustrates an example of the fuel cell system in Embodiment 8.

As illustrated in FIG. 9, the fuel cell system 100 in this embodiment includes the raw material gas heating unit 2, the hydro-desulfurizer 3, the reformer 5, the fuel cell 7, the combustor 8, the exhaust gas channel 9, the housing 10, and a heater 30. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The heater 30 heats the raw material gas heating unit 2 and can be on/off-controlled. The heater 30 may be any kind of mechanism that can heat the raw material gas heating unit 2 and can be on/off-controlled. As an example, the heater 30 may be a heater disposed on the surface of the raw material gas conduit in which raw material gas flows as illustrated in FIG. 9.

With the foregoing arrangement, when the hydro-desulfurizer 3 is heated to an appropriate temperature within a short time at the startup of the fuel cell 7, for example, activation of the heater 30 can reduce the possibility of insufficient heating ability of the raw material gas heating unit 2 for heating through heat exchange with exhaust gas. After the hydro-desulfurizer 3 has been heated to an appropriate temperature, the heater 30 may be switched off to reduce power consumption.

Embodiment 9

The fuel cell system in this embodiment is the fuel cell system according to any one of Embodiment 1, Example 1 and Example 2 of Embodiment 1, Embodiments 2 through 6, the variation of Embodiment 6, and Embodiment 7, and includes a heater that heats the hydro-desulfurizer and the heater is on/off-controllable.

With this arrangement, when the hydro-desulfurizer is to be heated to an appropriate temperature within a short time at the startup of the fuel cell, for example, activation of the heater can reduce the possibility of insufficient heating ability in heating of the hydro-desulfurizer through heat exchange with exhaust gas. After the hydro-desulfurizer has been heated to an appropriate temperature, the heater may be switched off to reduce power consumption.

Except for the foregoing, the fuel cell system in this embodiment may have a similar structure to the fuel cell system according to any one of Embodiment 1, Example 1 and Example 2 of Embodiment 1, Embodiments 2 through 6, the variation of Embodiment 6, and Embodiment 7.

[Device Structure]

Figure 10:
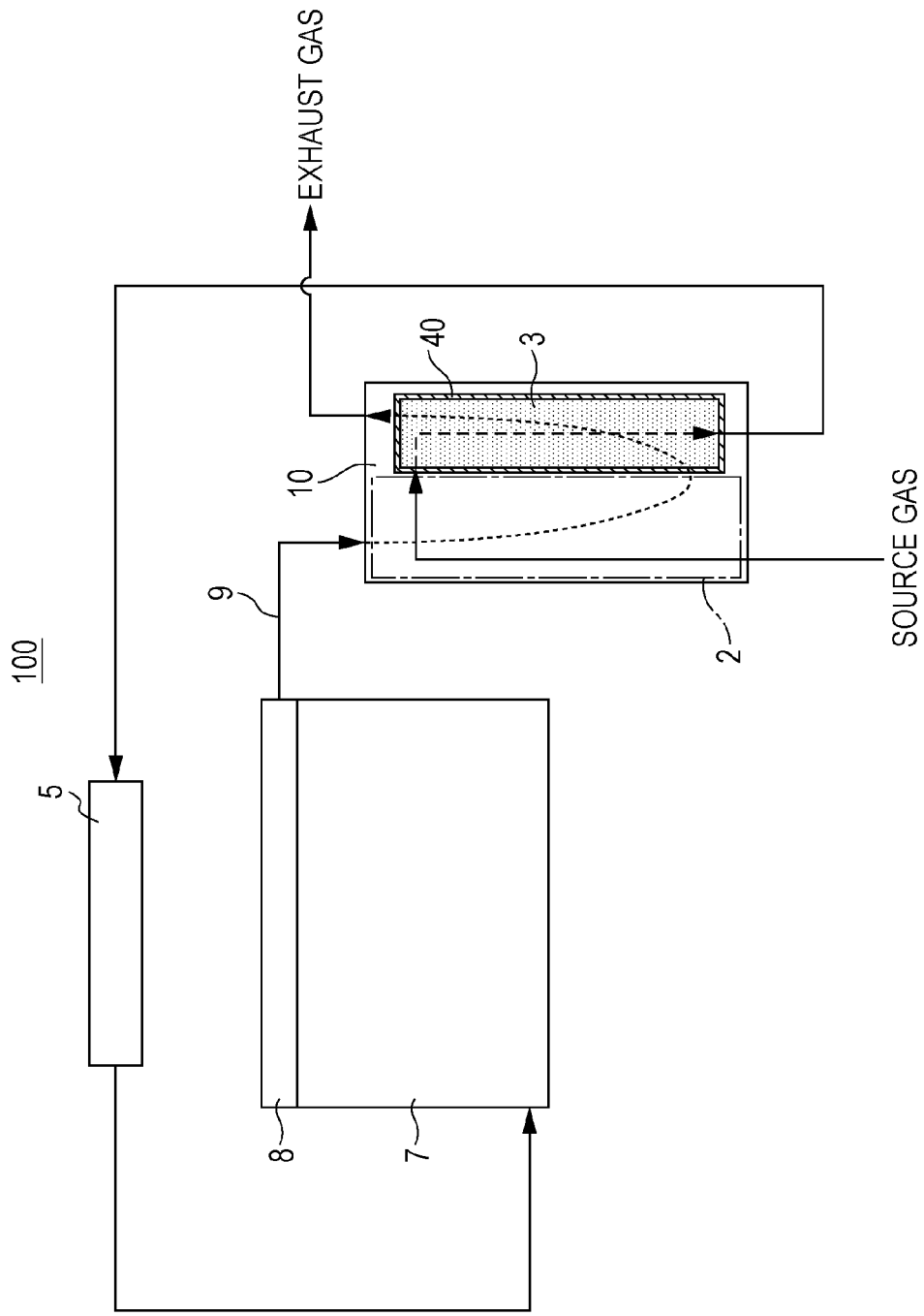
FIG. 10 illustrates an example of the fuel cell system in Embodiment 9.

FIG. 10 illustrates an example of the fuel cell system in Embodiment 9.

As illustrated in FIG. 10, the fuel cell system 100 in this embodiment includes the raw material gas heating unit 2, the hydro-desulfurizer 3, the reformer 5, the fuel cell 7, the combustor 8, the exhaust gas channel 9, the housing 10, and a heater 40. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The heater 40 heats the hydro-desulfurizer 3 and can be on/off controlled. The heater 40 may be any kind of mechanism that can heat the hydro-desulfurizer 3 and can be on/off-controlled. As an example, the heater 40 may be a heater disposed on the outer surface of the wall of the hydro-desulfurizer 3 as shown in FIG. 10.

With the foregoing arrangement, when the hydro-desulfurizer 3 is to be heated to an appropriate temperature within a short time at the startup of the fuel cell 7, for example, activation of the heater 40 can reduce the possibility of insufficient heating ability in heating of the hydro-desulfurizer 3 through heat exchange with exhaust gas. After the hydro-desulfurizer 3 has been heated to an appropriate temperature, the heater 40 may be switched off to reduce power consumption.

Embodiment 10

The fuel cell system in this embodiment is the fuel cell system according to any one of Embodiment 1, Example 1 and Example 2 of Embodiment 1, the Embodiments 2 through 6, the variation of Embodiment 6, and Embodiments 7 through 9, and includes an inner casing that houses the reformer, the fuel cell, and the combustor, a heat insulating member disposed outside the inner casing, and an outer casing disposed outside the heat insulating member. The raw material gas flows in the inner casing and then in the direction in which the outer casing lies, before flowing into the raw material gas heating unit.

With this arrangement, when the ability of the raw material gas heating unit to heat the raw material gas is insufficient, the quantity of heat can be supplemented by the raw material gas passing through the inner casing of high temperature. In addition, when the temperature of raw material gas has become too high as a result of heating in the inner casing, the raw material gas to be fed to the hydro-desulfurizer can be cooled to an appropriate temperature with exhaust gas because the raw material gas can undergo heat exchange in the raw material gas heating unit with the exhaust gas flowing through the housing. In either case, accordingly, raw material gas at an appropriate temperature can be supplied to the hydro-desulfurizer.

Except for the foregoing, the fuel cell system in this embodiment may have a similar structure to the fuel cell system according to any one of Embodiment 1, Example 1 and Example 2 of Embodiment 1, Embodiments 2 through 6, the variation of Embodiment 6, and the Embodiments 7 through 9.

[Device Structure]

Figure 11:
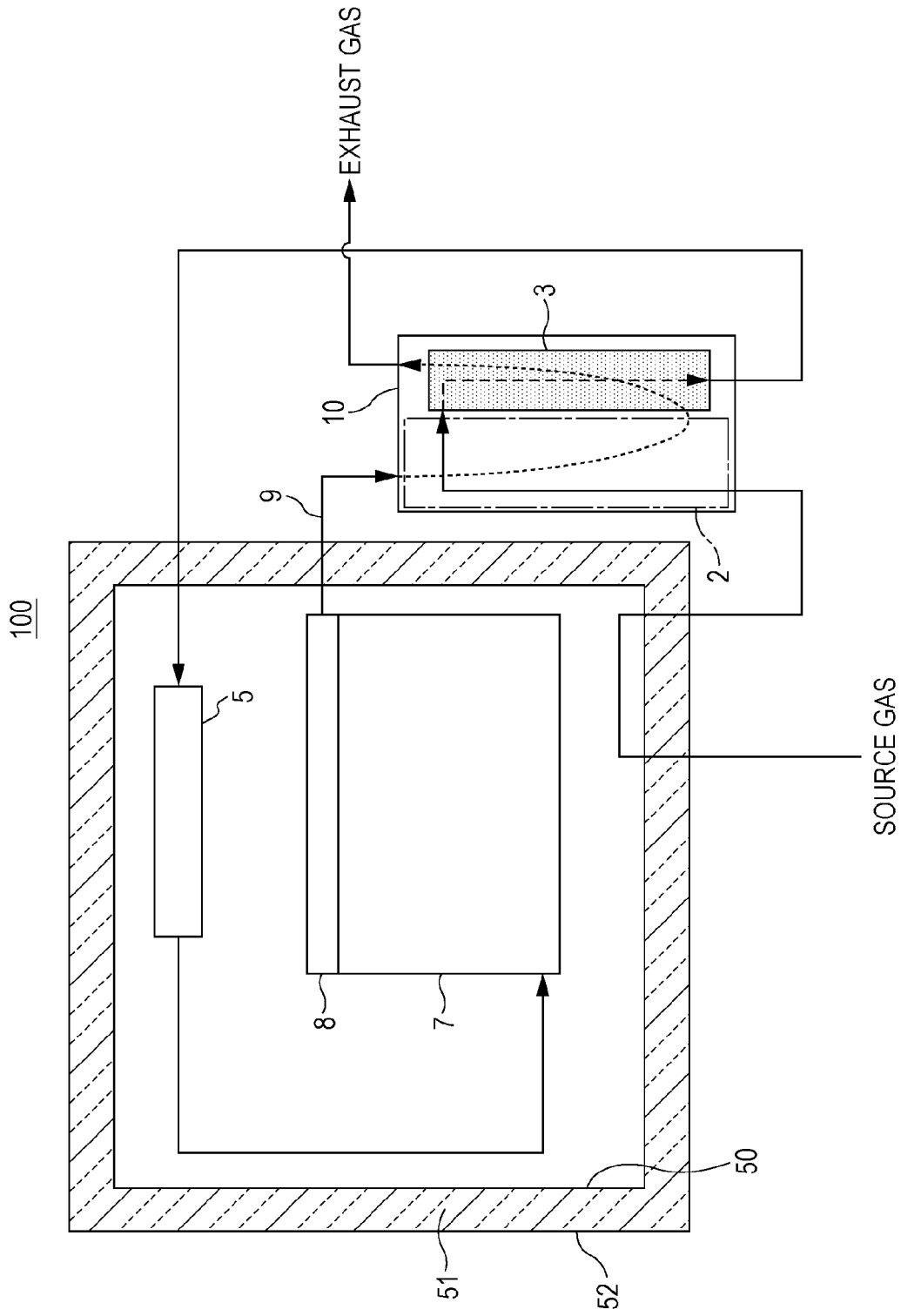
FIG. 11 illustrates an example of the fuel cell system in Embodiment 10.

FIG. 11 illustrates an example of the fuel cell system in Embodiment 10.

As illustrated in FIG. 11, the fuel cell system 100 in this embodiment includes the raw material gas heating unit 2, the hydro-desulfurizer 3, the reformer 5, the fuel cell 7, the combustor 8, the exhaust gas channel 9, the housing 10, an inner casing 50, a heat insulating member 51, and an outer casing 52. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The inner casing 50 houses the reformer 5, the fuel cell 7, and the combustor 8. The heat insulating member 51 is disposed outside the inner casing 50. The outer casing 52 is disposed outside the heat insulating member 51. The fuel cell system 100 can thus be structured such that the reformer 5 and the fuel cell 7 are housed in a single inner casing 50 (a hot module).

In this arrangement, as depicted in FIG. 11, raw material gas flows in the inner casing 50 and then in the direction in which the outer casing 52 lies, before flowing into the raw material gas heating unit 2. In this embodiment, raw material gas flows from within the inner casing 50 through the heat insulating member 51 to outside the outer casing 52, and is sent to the raw material gas heating unit 2. The raw material gas is thereby heated inside the inner casing 50 before passing through the raw material gas heating unit 2.

With the foregoing arrangement, when the ability of the raw material gas heating unit 2 to heat the raw material gas is insufficient, the quantity of heat can be supplemented by the raw material gas passing through the inner casing 50 of high temperature. In addition, when the temperature of raw material gas has become too high as a result of heating in the inner casing 50, the raw material gas flowing into the hydro-desulfurizer 3 can be cooled to an appropriate temperature with exhaust gas because the raw material gas can undergo heat exchange in the raw material gas heating unit 2 with exhaust gas flowing through the housing 10. In either case, accordingly, raw material gas at an appropriate temperature can be supplied to the hydro-desulfurizer 3.

Embodiment 11

The fuel cell system in this embodiment is the fuel cell system according to any one of Embodiment 1, Example 1 and Example 2 of Embodiment 1, Embodiments 2 through 6, the variation of Embodiment 6, and Embodiments 7 through 10, and includes a recycle gas channel that supplies part of reformed gas from the reformer as recycle gas to raw material gas upstream of the hydro-desulfurizer, and a heat exchanger in which raw material gas before entering the raw material gas heating unit undergoes heat exchange with the recycle gas.

With this arrangement, when the ability of the raw material gas heating unit to heat the raw material gas is insufficient, the quantity of heat can be supplemented by heat exchange between the raw material gas before entering the raw material gas heating unit and recycle gas. Furthermore, when the temperature of raw material gas has become too high as a result of heat exchange with recycle gas, the raw material gas flowing into the hydro-desulfurizer can be cooled to an appropriate temperature with exhaust gas because the raw material gas can undergo heat exchange in the raw material gas heating unit with the exhaust gas flowing through the housing. In either case, accordingly, raw material gas at an appropriate temperature can be supplied to the hydro-desulfurizer.

Except for the foregoing, the fuel cell system in this embodiment may have a similar structure to the fuel cell system according to any one of Embodiment 1, Example 1 and Example 2 of Embodiment 1, Embodiments 2 through 6, the variation of Embodiment 6, and Embodiments 7 through 10.

[Device Structure]

Figure 12:
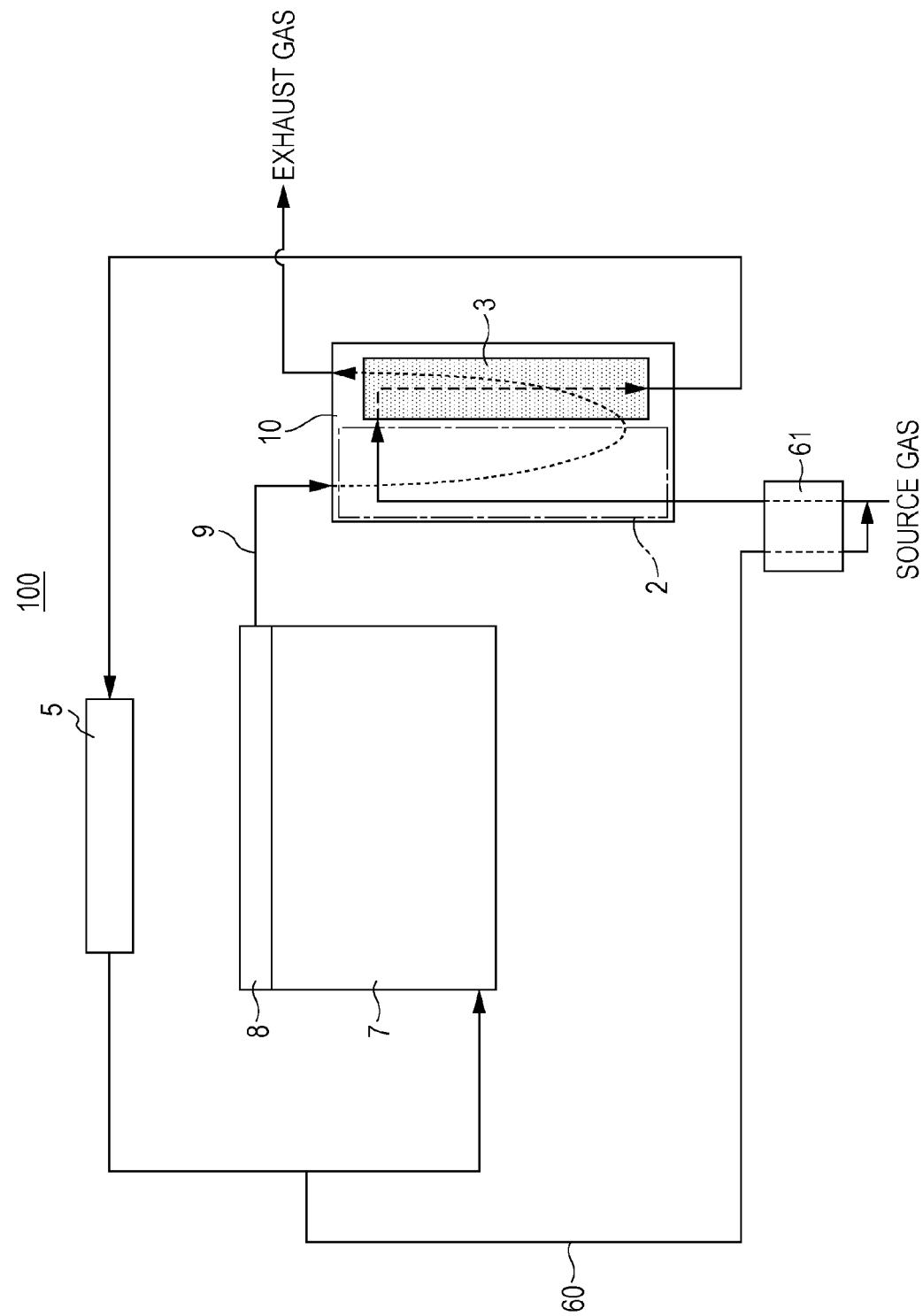
FIG. 12 illustrates an example of the fuel cell system in Embodiment 11.

FIG. 12 illustrates an example of the fuel cell system in Embodiment 11.

As shown in FIG. 12, the fuel cell system 100 in this embodiment includes the raw material gas heating unit 2, the hydro-desulfurizer 3, the reformer 5, the fuel cell 7, the combustor 8, the exhaust gas channel 9, the housing 10, a recycle gas channel 60, and a heat exchanger 61. As the raw material gas heating unit 2, hydro-desulfurizer 3, reformer 5, fuel cell 7, combustor 8, exhaust gas channel 9, and housing 10 are similar to Embodiment 1, descriptions of them are omitted.

The recycle gas channel 60 is a path for supplying part of reformed gas from the reformer 5 as recycle gas to raw material gas upstream of the hydro-desulfurizer 3. The upstream end of the recycle gas channel 60 may be connected to any portion of a channel through which reformed gas containing hydrogen discharged from the reformer 5 flows. In this embodiment, the recycle gas channel 60 branches from the reformed gas supply channel between the reformer 5 and the fuel cell 7 and meets the channel in which raw material gas upstream of the hydro-desulfurizer 3 flows, as shown in FIG. 12. This enables addition of hydrogen to the raw material gas on the way to the hydro-desulfurizer 3 so that the hydro-desulfurizer 3 can effect hydro-desulfurization of the raw material gas using the hydrogen.

In the heat exchanger 61, raw material gas before entering the raw material gas heating unit 2 undergoes heat exchange with recycle gas.

With this arrangement, when the ability of the raw material gas heating unit 2 to heat the raw material gas is insufficient, the quantity of heat can be supplemented by heat exchange between the raw material gas before entering the raw material gas heating unit 2 and recycle gas. Furthermore, when the temperature of raw material gas has become too high as a result of heat exchange with recycle gas, the raw material gas flowing into the hydro-desulfurizer 3 can be cooled to an appropriate temperature with exhaust gas because the raw material gas can undergo heat exchange in the raw material gas heating unit 2 with the exhaust gas flowing through the housing 10. In either case, accordingly, raw material gas at an appropriate temperature can be supplied to the hydro-desulfurizer 3.

From the foregoing disclosure, many improvements or other embodiments of the present disclosure will become apparent to those skilled in the art. The foregoing disclosure therefore should be construed only as illustrative and is presented for the purpose of showing the best aspect for carrying out the present disclosure to those skilled in the art. Substantial modifications may be made to the details of the structure and/or functionality without departing from the spirit of the present disclosure.

An aspect of the present disclosure can facilitate temperature control in a hydro-desulfurizer and also reduce the heating-up time for the hydro-desulfurizer and unevenness in temperature in it compared to conventional techniques. An aspect of the present disclosure can therefore be applied to a fuel cell system, for example.

What is claimed is:

1. A fuel cell system comprising:
  a hydro-desulfurizer that removes a sulfur compound in raw material gas;
  a raw material gas heating unit that heats raw material gas before the raw material gas enters the hydro-desulfurizer;
  a reformer that generates reformed gas using the raw material gas that has passed through the hydro-desulfurizer;
  a fuel cell that generates electric power using the reformed gas from the reformer as fuel;
  a combustor that combusts fuel unused in the fuel cell;
  an exhaust gas channel through which exhaust gas generated in the combustor flows; and
  a housing that is provided in a part of the exhaust gas channel and houses the raw material gas heating unit and the hydro-desulfurizer,
  wherein exhaust gas flowing through the housing undergoes heat exchange with the raw material gas heating unit and the hydro-desulfurizer.

2. The fuel cell system according to claim 1,
  wherein the raw material gas heating unit includes a raw material gas conduit through which the raw material gas flows, and
  wherein the exhaust gas flows between the raw material gas conduit and the hydro-desulfurizer.

3. The fuel cell system according to claim 1, wherein the exhaust gas in the housing undergoes heat exchange with the raw material gas in the raw material gas heating unit and subsequently undergoes heat exchange with the hydro-desulfurizer.

4. The fuel cell system according to claim 1,
  wherein the housing includes at least one partition component disposed between the raw material gas heating unit and the hydro-desulfurizer, and
  wherein the exhaust gas flows so as to turn around at an end of the partition component.

5. The fuel cell system according to claim 1, wherein the flow of the exhaust gas in the housing and the flow of the raw material gas in the raw material gas heating unit are substantially counter to each other at least once.

6. The fuel cell system according to claim 5, wherein the flow of the exhaust gas in the housing and the flow of the raw material gas in the raw material gas heating unit are substantially counter and substantially parallel to each other at least once respectively.

7. The fuel cell system according to claim 1, wherein the raw material gas in the hydro-desulfurizer flows in a substantially vertical direction.

8. The fuel cell system according to claim 1,
  wherein the hydro-desulfurizer includes a plurality of hydro-desulfurizing units, and a connection that connects between neighboring hydro-desulfurizing units, and
  wherein the raw material gas flows so as to turn around in the connection.

9. The fuel cell system according to claim 8,
  wherein the housing includes at least one partition component disposed between the neighboring hydro-desulfurizing units, and
  wherein the exhaust gas flows so as to turn around at an end of the partition component.

10. The fuel cell system according to claim 1, wherein a heat transfer rate of a wall of the hydro-desulfurizer is higher on a downstream side of the exhaust gas channel than on an upstream side.

11. The fuel cell system according to claim 1, further comprising:
  a heater that heats the raw material gas heating unit,
  wherein the heater is on/off-controllable.

12. The fuel cell system according to claim 1, further comprising:

a heater that heats the hydro-desulfurizer,
wherein the heater is on/off-controllable.

13. The fuel cell system according to claim 1, further comprising:
- an inner casing that houses the reformer, the fuel cell, and the combustor;
- a heat insulating member disposed outside the inner casing; and
- an outer casing disposed outside the heat insulating member,
- wherein the raw material gas flows in the inner casing and then in a direction in which the outer casing lies, before flowing into the raw material gas heating unit.

14. The fuel cell system according to claim 1, further comprising:
- a recycle gas channel that supplies a part of reformed gas from the reformer as recycle gas to raw material gas upstream of the hydro-desulfurizer; and
- a heat exchanger in which the raw material gas before entering the raw material gas heating unit undergoes heat exchange with the recycle gas.

* * * * *